J. R. METHVEN.
WEIGHING SCALE.
APPLICATION FILED SEPT. 10, 1917.

1,290,278.

Patented Jan. 7, 1919.

WITNESSES:
G. E. Crout
Charles C. Neale

James R. Methven INVENTOR.

UNITED STATES PATENT OFFICE.

JAMES R. METHVEN, OF MINNEAPOLIS, MINNESOTA.

WEIGHING-SCALE.

1,290,278.  Specification of Letters Patent.  Patented Jan. 7, 1919.

Application filed September 10, 1917. Serial No. 190,647.

*To all whom it may concern:*

Be it known that I, JAMES R. METHVEN, a citizen of the United States, residing at Minneapolis, in the county of Hennepin and State of Minnesota, have invented certain new and useful Improvements in Weighing-Scales, of which the following is a specification.

My invention relates to what are known as "gravity scales", wherein equal arm beams and weights are employed, and is more particularly applicable to the types known as "Roberval" and "torsion" balances.

The object of this invention is to give warning to the operator by a slow, steady movement of the beam and pointer when approaching the point of equilibrium, thus preventing overweight.

The mechanism requires but slight modification for any type of an even arm scale or balance. For the sake of clearness my invention is illustrated in the accompanying drawings, wherein like characters indicate like parts throughout the several views.

Figure 1:
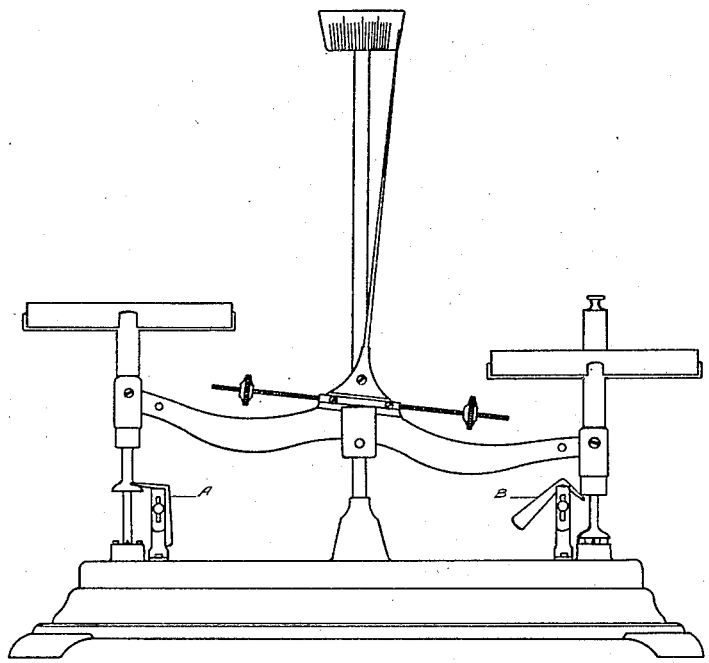
Figure 1 is a front elevation of an ordinary even arm weighing scale, having applied thereto my invention in its preferred form and arrangement.
Figure 3:
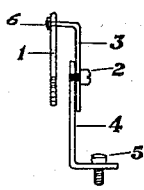
Fig. 3 is an end view of the same.
Figure 2:
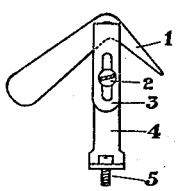
Fig. 2 is an enlarged view showing a front elevation of the attachment.

Referring to Figs. 2 and 3, the bent lever 1 is connected with the support extension 3 by means of a fulcrum pivot 6, Fig. 3, on which it can freely oscillate. The extension support 3 is slidably mounted on the main support 4 by means of a screw 2 passing through a slot in the extension support 3. The assembled parts are mounted on the base of the scale as shown in Fig. 1. This may be conveniently accomplished by means of a screw 5 passing through a hole in the lower off-set end of the main support 4 and threaded into the base of the scale. The arrangement is identical for each pan of the scale so that when the scale is in equilibrium the bent levers 1—1 revert to a vertical position as shown at A, Fig. 1. The attachment operates in the following manner: A known weight being placed on one pan of the scale lowers the pan as far as the stops will allow; in doing so the yoke, truss or pan support comes in contact with the short arm of the bent lever 1, forcing it to an angular position as shown at B, Fig. 1.

The long arm of the bent lever, having a predetermined weight, operates as a lifting power in opposition to the weight placed on the pan. When the amount of the commodity to be weighed in the opposite pan reaches the weight desired, less the lifting power of the bent lever 1, the pan carrying the known weight begins to rise slowly and steadily, thus giving warning to the operator that the scale is approaching equilibrium, so the remaining amount of the commodity needed can be added slowly, thus preventing overweight. When equilibrium is secured the long arms of both levers 1—1 are in a vertical position and the short arms of both levers are in a horizontal position and not in contact with the oscillating parts of the scale so that the sensitiveness and accuracy of the scale is not disturbed. The attachment also prevents a jerky or vibratory action of the oscillating parts of the scale when approaching equilibrium.

What I claim, and desire to secure by Letters Patent of the United States, is as follows:

1. In a weighing scale, a support adapted to be attached to the base of the scale, and a bent lever pivoted upon said support, said lever having a depending weighted arm and a laterally-extended arm positioned to act as a check when the moving member of the scale comes into contact therewith.

2. In a weighing scale, a main support adapted to be attached to the base of the scale, an extension support adjustably connected to the upper end of said main support, and a bent lever pivoted upon the upper end of said extension support, said lever having a depending weighted arm and a laterally-extending arm adapted to be engaged by a moving member of the scale.

In testimony whereof, I affix my signature in presence of two witnesses.

JAMES R. METHVEN.

Witnesses:
C. L. METHVEN,
G. E. COONS.

Copies of this patent may be obtained for five cents each, by addressing the "Commissioner of Patents, Washington, D. C."